(12) United States Patent
Oishi et al.

(10) Patent No.: US 6,389,812 B2
(45) Date of Patent: May 21, 2002

(54) HYDRAULIC BRAKE APPARATUS

(75) Inventors: Masaki Oishi, Toyota; Hideki Yamamoto, Handa; Takashi Kurokawa, Aichi; Michiharu Nishii, Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/801,775

(22) Filed: Mar. 9, 2001

(30) Foreign Application Priority Data

Mar. 14, 2000 (JP) .......................... 2000-070698

(51) Int. Cl.⁷ .............................. B60T 13/20; F15B 9/10
(52) U.S. Cl. ........................................ 60/554; 91/369.2
(58) Field of Search ............................ 60/547.1, 547.3, 60/551, 554, 560, 593; 91/369.2

(56) References Cited

U.S. PATENT DOCUMENTS

| | | | | |
|---|---|---|---|---|
| 3,490,231 A | * | 1/1970 | Klein | 60/548 |
| 3,967,536 A | | 7/1976 | Bach | |
| 4,038,822 A | * | 8/1977 | Dodge | 60/554 |
| 4,199,948 A | * | 4/1980 | Matheus et al. | 60/553 |
| 4,548,037 A | * | 10/1985 | Farr | 60/552 |
| 4,566,275 A | * | 1/1986 | Farr | 60/554 |
| 4,874,207 A | * | 10/1989 | Nishii et al. | 60/555 X |
| 4,899,640 A | * | 2/1990 | Kono | 60/548 X |

FOREIGN PATENT DOCUMENTS

| | | | | |
|---|---|---|---|---|
| DE | 3224828 A1 | * | 1/1983 | 91/369.2 |
| GB | 2051987 A | * | 1/1981 | 91/369.2 |
| GB | 2102519 A | * | 2/1983 | 91/369.2 |

* cited by examiner

*Primary Examiner*—John E. Ryznic
(74) *Attorney, Agent, or Firm*—Burns, Doane, Swecker & Mathis, LLP

(57) ABSTRACT

A hydraulic pressure brake apparatus which smoothly adds the assistance force of a hydraulic pressure booster to a master cylinder piston after the assistance limitation by a negative pressure booster includes a negative pressure booster that assists a master cylinder piston, a hydraulic pressure booster that assists the master cylinder piston by outputting the hydraulic pressure of a hydraulic pressure pump after the assistance limitation of the negative pressure booster, and a valve mechanism that controls the assistance by the hydraulic pressure booster. A single reaction member in the form of a reaction force rubber disc is provided between the master cylinder piston and the hydraulic pressure booster to transmit the reaction force to a brake pedal via the reaction force rubber disc.

15 Claims, 4 Drawing Sheets

HYDRAULIC BRAKE APPARATUS

This application is based on and claims priority under 35 U.S.C. § 119 with respect to Japanese Application No. 2000-070698 filed on Mar. 14, 2000, the entire content of which is incorporated herein by reference.

FIELD OF THE INVENTION

This invention generally relates to a vehicle brake apparatus. More particularly, the present invention pertains to a hydraulic pressure brake apparatus for a vehicle provided with a negative pressure assistance device and a hydraulic pressure assistance device for actuating a master cylinder in accordance with the depression of a brake pedal.

BACKGROUND OF THE INVENTION

A hydraulic pressure brake apparatus provided with a negative pressure assistance device and a hydraulic pressure assistance device is disclosed in U.S. Pat. No. 3,967,536. The disclosed brake apparatus includes a pneumatic power brake device (forming a negative pressure assistance device), a hydraulic power brake device (forming a hydraulic pressure assistance device) that uses the outlet hydraulic brake pressure of a pump for power steering, and a valve in the form of a poppet valve. An auxiliary hydraulic pressure source is also provided in case of an engine stop. The auxiliary hydraulic pressure source is in the form of an electric pump that is switch operated by a pressure actuation switch positioned between the pump and a power steering gear so that the electric pump is operated by the switch in accordance with the pressure.

The outlet hydraulic brake pressure of the electric pump and the pump for power steering are provided for the hydraulic pressure assistance and it is capable of switching assistance from assistance by the negative pressure assistance device to adding assistance by the hydraulic pressure assistance device. The apparatus is designed with a reaction force mechanism that includes two reaction force members, i.e., a reaction force disc portion for negative pressure assistance and a poppet valve portion when the hydraulic pressure assistance is added to the negative pressure assistance.

It can be difficult to ensure smooth braking characteristics when the reaction force mechanism is defined by a plurality of members. It may be particularly difficult to conduct smooth braking force control when adding the assistance by the hydraulic pressure assistance device after the assistance limitation by the negative pressure assistance device. Further, if the above-described device is used under different specifications in the same vehicle model, it is necessary to consider the adaptability of the plurality of reaction force members to each specification, thus providing complications. More specifically, if the input and output characteristics of the negative pressure assistance device (i.e., the specification) is changed by changing the reaction force member for negative pressure assistance, it is necessary to change a reaction force member for both hydraulic pressure assistance and negative pressure assistance based on the change of the reaction force member for negative pressure assistance in order to conduct smooth brake force control when adding the hydraulic pressure assistance to the negative pressure assistance.

In light of the foregoing, a need exists for a hydraulic pressure brake apparatus that is capable of relatively smoothly adding the assistance by the hydraulic pressure assistance device after the assistance limitation by the negative pressure assistance device when actuating the master cylinder in accordance with brake pedal depression.

SUMMARY OF THE INVENTION

A hydraulic brake pressure apparatus includes a master cylinder that advances a master cylinder piston in accordance with the depression of a brake pedal to increase the brake fluid pressure from a reservoir and output the hydraulic brake pressure, a negative pressure assistance device that assists the master cylinder piston by negative pressure in accordance with the depression of the brake pedal, a pump for increasing the brake fluid pressure of the reservoir independently from the master cylinder to output the hydraulic brake pressure, and a hydraulic pressure assistance device that assists the master cylinder piston by supplying the output hydraulic pressure of the pump to a power chamber formed rearward of the master cylinder piston in accordance with the depression of the brake pedal. A valve controls the assisting force of the master cylinder piston by the hydraulic pressure assistance device. A reaction force mechanism in the form of a single reaction force member is provided between the master cylinder piston and the hydraulic pressure assistance device to transmit the reaction force to the brake pedal.

By virtue of this construction involving the negative pressure assistance device, the hydraulic pressure assistance device, the valve that controls the assistance by the hydraulic pressure assistance device, and the single reaction force member between the master cylinder piston and the hydraulic pressure assistance device to transmit the reaction force to the brake pedal via the reaction force mechanism, the reaction force in accordance with the brake depression is determined by a single reaction member to thus smoothly add the hydraulic pressure assistance to the negative pressure assistance.

In the hydraulic pressure brake apparatus of the present invention, the hydraulic pressure assistance device is positioned to be capable of pressing the master cylinder piston and is provided with a power piston forming the power chamber on the rearward side of the master cylinder piston. The power piston can thus be connected to the negative pressure assistance device. The hydraulic pressure assistance device can thus be manufactured relatively easily at a low cost.

The valve is preferably configured to prohibit the addition of the assistance by the hydraulic pressure assistance device until reaching the assistance limitation of the assistance of the master cylinder piston by the negative pressure assistance device and to allow the addition of the assistance of the master cylinder piston by the hydraulic pressure assistance device when exceeding the assistance limitation of the assistance by the negative pressure assistance device. For instance, when the valve includes a spool valve mechanism having a spool that is movable relative to the power piston in accordance with the depression of the brake pedal, the reaction force mechanism can be in the form of a reaction force rubber disc between the spool and the master cylinder piston. Because the valve is in the form of a spool valve mechanism and the reaction force mechanism is in the form of a reaction rubber disc provided between the spool and the master cylinder pistons, a relatively wide range of boosting performance can be set with a relatively simple and inexpensive construction.

In accordance with another aspect of the invention, a hydraulic pressure brake apparatus includes a master cylinder that includes a master cylinder piston advanced in accordance with depression of a brake pedal to increase brake fluid pressure from a reservoir and output a hydraulic brake pressure, a housing having an interior divided by a movable wall into a constant pressure chamber communicated with a negative pressure source and a variable pressure chamber alternatively communicated with the constant pressure chamber and atmosphere, and a control valve for communicating the variable pressure chamber with atmosphere upon depression of the brake pedal to produce an assisting force for moving a power piston to assist advancement of the master cylinder piston, with the power piston forming a power chamber rearward of the master cylinder piston. A pump is in communication with the power chamber to increase brake fluid pressure of the reservoir independently from the master cylinder and output hydraulic brake pressure to the power chamber, while a valve controls pressure in the power chamber to provide a hydraulic pressure assistance to the master cylinder piston. In addition, a reaction force member is provided between the master cylinder piston and the power piston to transmit a reaction force to the brake pedal.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
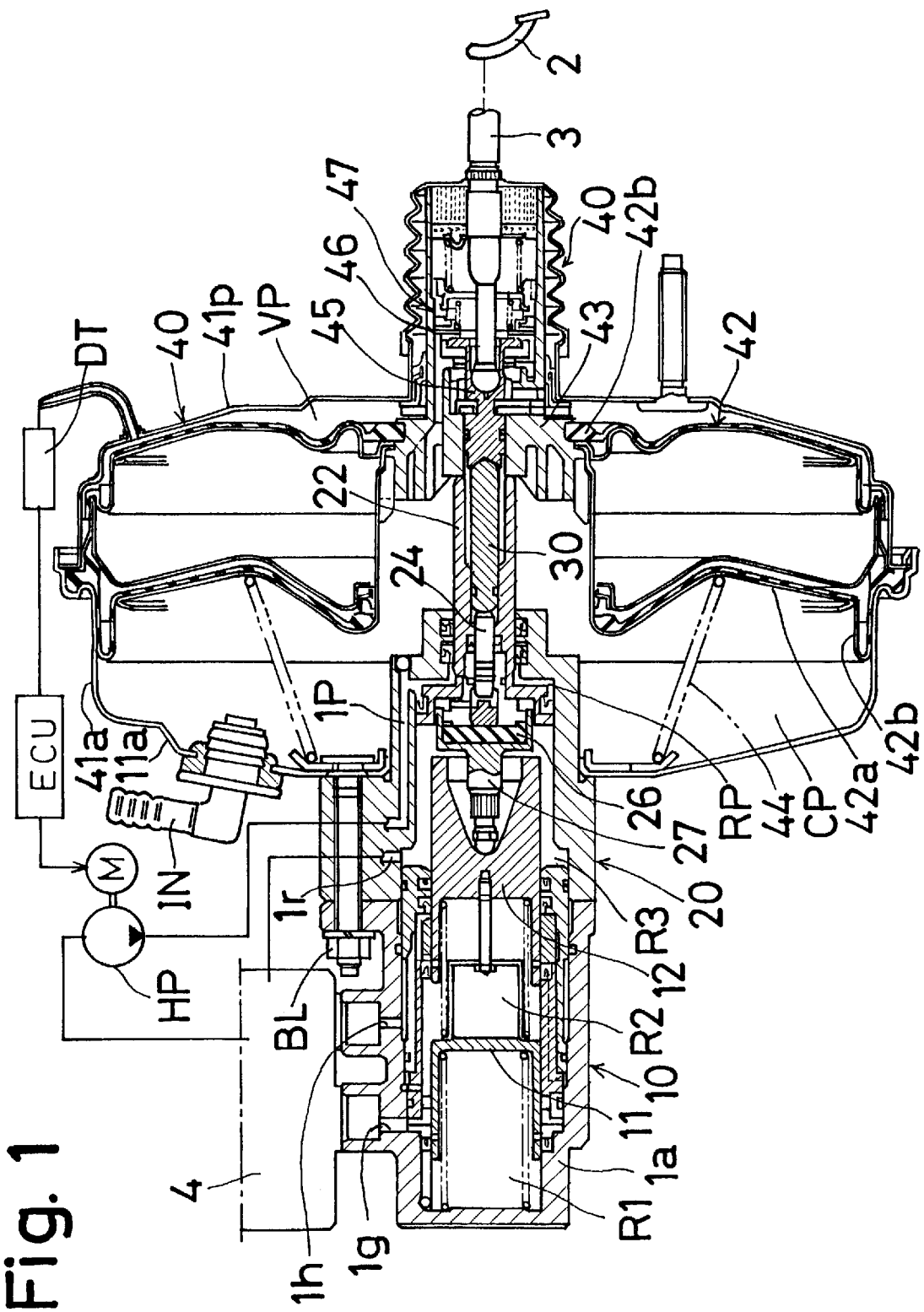
FIG. 1 is a cross-sectional view of a hydraulic brake apparatus according to the present invention.

Referring initially to FIG. 1, the hydraulic pressure brake apparatus of the present invention includes a hydraulic pressure booster 20 positioned between a forwardly located master cylinder 10 (positioned to the left in FIG. 1) and a rearwardly located negative pressure booster 40 (i.e., positioned to the right in FIG. 1). A brake pedal 2 is connected to the rear of the negative pressure booster 40. The stepping or depression force applied to the brake pedal 2 is transmitted as a brake operation force via an input rod 3 to assist the brake operation force by the negative pressure booster 40. When the negative pressure booster 40 reaches the limitation for assistance, the brake operation force is assisted by the hydraulic pressure booster 20 to output the hydraulic brake pressure from the master cylinder. The output hydraulic brake pressure of the master cylinder 10 is supplied to the wheel cylinders (not shown) that are operatively associated with each of the vehicle wheels. The negative pressure booster 40 and the hydraulic pressure booster 20 which assist the brake operation force for operating the master cylinder 10 in accordance with the depression of the brake pedal 2 form a negative pressure assisting device and a hydraulic pressure assisting device respectively.

Figure 2:
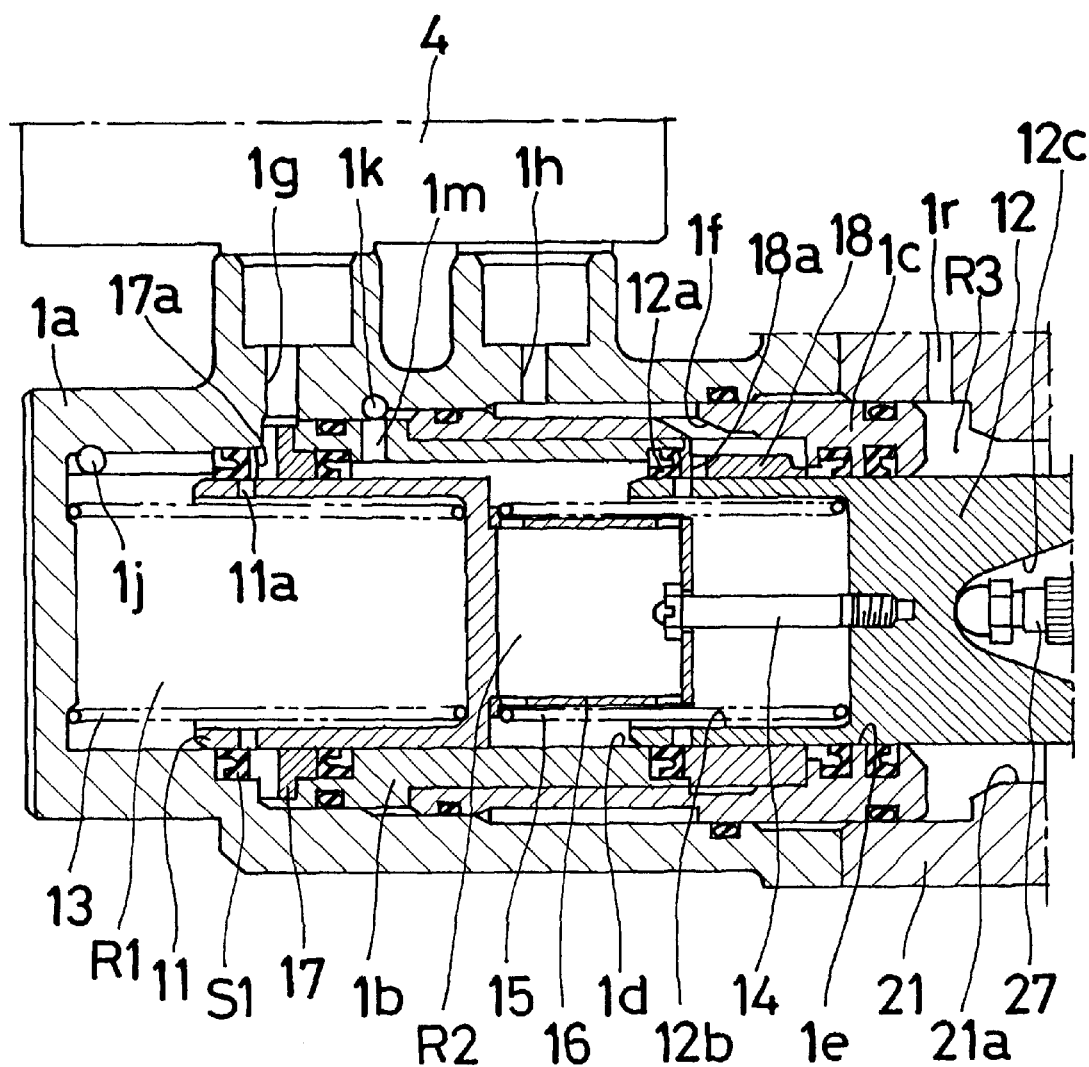
FIG. 2 is an enlarged cross-sectional view of a master cylinder forming a part of the of the hydraulic brake apparatus shown in FIG. 1.

As shown in FIG. 2, the master cylinder 10 includes a first cylinder 1a having an internal bore that is closed at one end and open at the opposite end. The first cylinder 1a accommodates a second cylinder 1b and a third cylinder 1c, both of which have oppositely located open ends. In addition, a first piston 11 and a second piston 12 are accommodated in the cylinders. The first piston 11 is generally cup-shaped, possessing a bore that is closed at one end to define a recessed portion in the first piston 11. The recessed portion in the first piston 11 opens in the forward direction (i.e., to the left in FIG. 2). The second piston 12 is also provided with a bore that is closed at one end to define a first recessed portion 12b that opens in the forward direction (i.e., to the left in FIG. 2). The second piston 12 is also provided with a second recessed portion 12c that opens rearwardly (i.e., to the right in FIG. 2).

The first cylinder 1a is cylindrically shaped, and the bore in the first cylinder 1a is stepped near the bottom portion of the bore (i.e., near the closed end) so that the internal dimension of the bore gradually increases towards the open end. The second cylinder 1b is cylindrically shaped and has a first cylinder bore 1d. The third cylinder 1c is generally cylindrically shaped and includes a stepped inner bore. A second cylinder bore 1e of the stepped bore has a large diameter portion whose inner diameter is larger than that of the first cylinder bore 1d and a smaller diameter portion whose inner diameter is smaller than that of the first cylinder bore 1d. The first cylinder 1a is provided with first and second supply ports 1g, 1h, and first and second output ports 1j, 1k. In addition, a first communication bore 1m in communication with the output port 1k is formed on the second cylinder 1b, and a second communication bore 1f in communication with the supply port 1h is formed on the third cylinder 1c.

The second cylinder 1b is accommodated in the first cylinder 1a via a first annular member 17 that is provided with a generally radially extending third communication bore 17a. Two cup seal members S1 are also provided, with each one being positioned on one side of the annular member 17. A second annular member 18 formed with a generally radially extending fourth communication bore 18a is provided in the third cylinder 1c, with a cup seal member being positioned on each side of the second annular member 18 as shown in FIG. 2.

The first piston 11 is slidably accommodated in the first annular member 17 in a liquid-tight manner. A first pressure chamber R1 is thus formed between the first cylinder 1a and the first piston 11 (i.e., between the closed bottom of the first cylinder 1a and the closed bottom of the first piston 11). A fifth communication bore 11a formed at the front end portion of the first piston 11 (i.e., at the open end portion of the first piston 11) opposes the fourth communication bore 17a of the first annular member 17 to establish communication between the pressure chamber R1 and a reservoir 4 via the supply port 1g.

The tip portion or end portion of an output rod 27 contacts the second recessed portion 12c on the rear of the second piston 12. A hydraulic chamber R3 is thus formed between the outer peripheral surface of the second piston 12 and the inner peripheral surface of a third cylinder bore 21a of a fourth cylinder 21 to always establish communication with a discharge port 1r.

A first return spring 13 is positioned between the bottom of the bore or recessed portion in the first cylinder 1a and the bottom of the recessed portion of the first piston 11. The first piston 11 is thus biased in the rearward direction towards the second piston 12. The rear end of a rod 14 is connected to the bottom of the first recessed portion 12b on the front portion of the second piston 12. The tip end portion of a retainer 16 engages the head portion of the rod 14 while the opposite bottom portion of the retainer 16 contacts the rear end surface of the first piston 11.

A second spring 15 is disposed between the bottom portion of the retainer 16 and the forwardly facing bottom of the first recessed portion 12b of the second piston 12. This second spring 15 applied a biasing force between the first and second pistons 11, 12 to expand or increase the distance between the first piston 11 and the second piston 12. In addition, a second pressure chamber R2 is formed between the first and second pistons.

As shown in FIG. 1, the hydraulic pressure booster 20 is positioned between the first cylinder 1a of the master cylinder 10 and the negative pressure booster 40. The fourth cylinder 21 is connected between the first cylinder 1a and the negative pressure booster 40 with a bolt BL.

Figure 3:
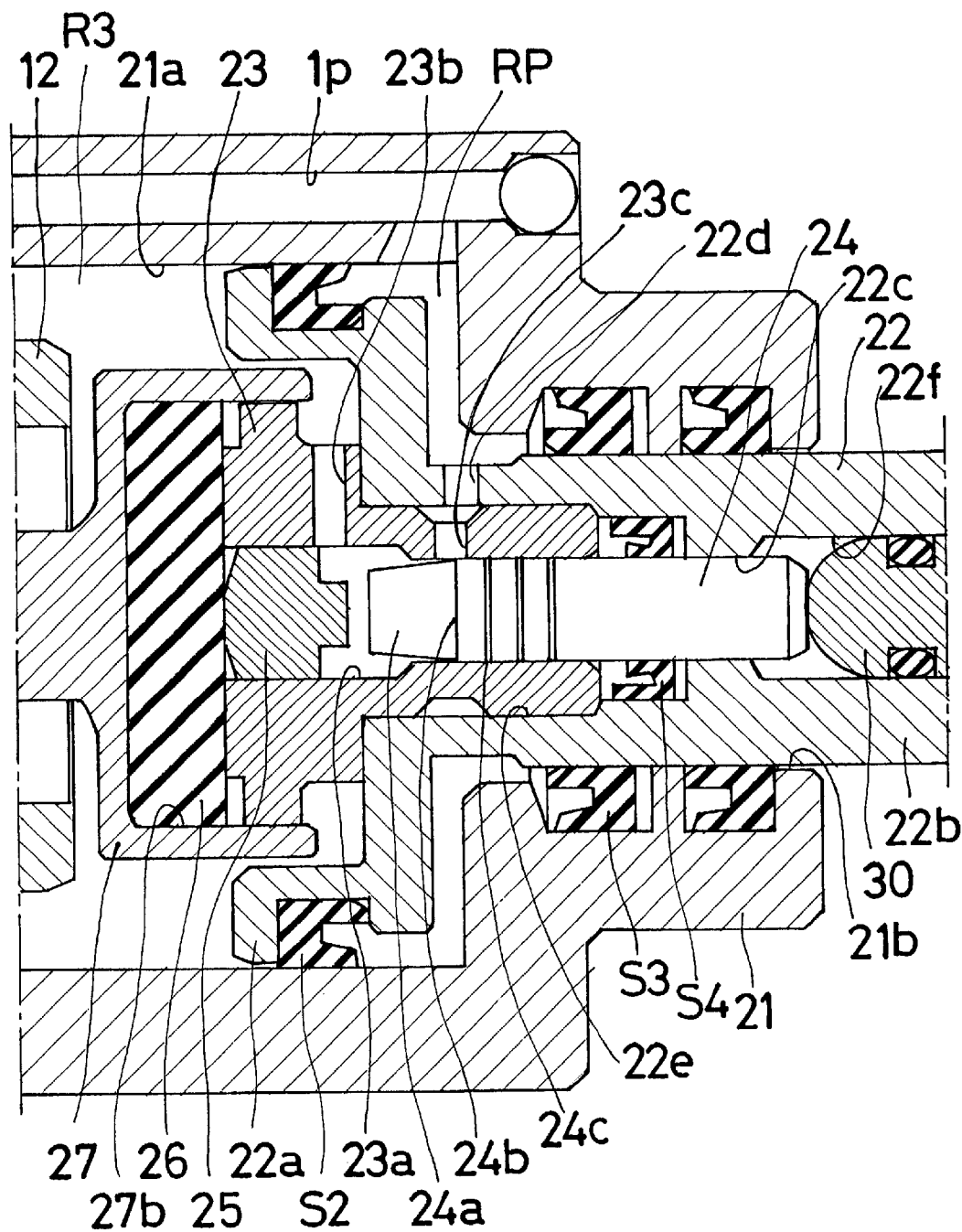
FIG. 3 is an enlarged cross-sectional view of the hydraulic pressure booster of the hydraulic brake apparatus shown in FIG. 1.

The hydraulic pressure booster 20 is constructed in the manner shown in FIG. 3. The fourth cylinder 21 is provided with a stepped bore defined by a larger diameter third cylinder bore 21a and a smaller diameter fourth cylinder bore 21b. A large diameter portion 22a of a power piston 22 is slidably supported in the large diameter third cylinder bore 21a. A small diameter portion 22b of the power piston 22 is slidably supported in the small diameter fourth cylinder bore 21b. Accordingly, a power chamber RP is formed rearward of the large diameter portion 22a of the power piston 22 in the fourth cylinder bore 21a of the fourth cylinder 21. The power chamber RP is adapted to communicate with an input port 1p.

An axially extending small diameter bore 22c is formed in the small diameter portion 22b of the power piston 22. A radially extending seventh communication bore 22d is formed between the large diameter portion 22a and the small radial bore 22c. A cup shaped first seal member S2 is disposed on one end (i.e., the left side as viewed in FIG. 3) of the large diameter portion 22a of the power piston 22 to ensure a sealing effect for the power chamber RP. A pair of axially spaced apart annular grooves forming a first annular groove and a second annular groove are formed on the inner surface of the fourth cylinder bore 21b of the fourth cylinder 21. A cup seal member S3 is accommodated in each annular groove to ensure the sealing effect for the power chamber RP.

Recessed regions are formed on the front and rear sides of the small diameter bore 22c of the power piston 22. These recessed regions possess interior dimensions larger than the small diameter bore 22c of the power piston 22. A sleeve 23 is disposed in a stepped recessed portion 22e formed on the front side of the small diameter bore 22c, with a second cup seal member S4 located axially between the end of the sleeve 23 and the small diameter bore 22c of the power piston 22.

The sleeve 23 includes an axially extending stepped bore 23a. A radially extending eighth communication bore 23b is formed in the sleeve 23 in communication with the large diameter side of the stepped bore 23a and a radially extending ninth communication bore 23c is formed in the sleeve 23 in communication with the small diameter side of the stepped bore 23a. A spool 24 is accommodated in the stepped bore 23a of the sleeve 23. The spool 24 is slidably supported by the small diameter portion of the stepped bore 23a and is slidably supported by the small diameter bore 22c of the power piston 22.

The spool 24 is generally cylindrically shaped and includes a tapered surface 24a on the front end (i.e., the left end in FIG. 3) and a stepped portion 24b between the main body portion of the spool and the tapered surface 24a. A plurality of circumferentially extending annular grooves 24c are formed on the outer periphery of the main body portion of the spool 24 to help center the spool 24 in the stepped bore 23a. A relatively small quantity of brake fluid in the power chamber RP flows into the annular grooves 24c via a small clearance between the spool 24 and the sleeve 23, and so the spool 24 is centered in the stepped bore 23a. The spool 24 is thus able to smoothly move in the sleeve 23 without significant resistance.

When the spool 24 is accommodated in the stepped bore 23a of the sleeve 23, the stepped portion 24b of the spool opposes the ninth communication bore 23c at its initial position. A transmitting member 25 is accommodated in the larger diameter side of the stepped bore 23a of the sleeve 23 at a position in front of the spool 24. The front end portion of the sleeve 23 is accommodated in a third recessed portion 27b formed at the rear end (i.e., the right end as seen in FIG. 3) of the output rod 27. A reaction force rubber disc or reaction member 26 is positioned between the closed bottom end of the recessed portion 27b and the front end of the sleeve 23.

As described above, the valve used to control the assistance force applied by the hydraulic assistance device is in the form of a spool valve mechanism. In the condition shown in FIG. 1 and FIG. 3, the power chamber RP is in communication with the hydraulic chamber R3 and eventually with the reservoir 4 via the communication bore 22d of the power piston 22, the communication bore 23c of the sleeve 23, a gap between the communication bore 23c and the tapered surface 24a of the spool 24, the stepped bore 23a and the communication bore 23b of the sleeve 23. Accordingly, in the condition shown in FIGS. 1 and 3, the power chamber RP maintains atmospheric pressure. When the spool 24 moves in the forward direction relative to the power piston 22, the tip portion of the spool 24 contacts the transmitting member 25. When the spool 24 moves further forward, the tip portion of the spool 24 compresses the reaction force rubber disc 26. Consequently, the communication bore 23c of the sleeve 23 is closed by the stepped portion 24b of the spool 24 to block communication between the power chamber RP and the hydraulic chamber R3. Accordingly, when the output hydraulic pressure of a hydraulic pressure pump HP is supplied to the power chamber RP, the pressure is increased. On the other hand, when the spool 24 retracts relative to the power piston 22 (i.e., moves to the right in FIGS. 1 and 3), the communication bore 23c of the sleeve 23 is opened to establish communication between the power chamber RP and the hydraulic chamber R3 so that atmospheric pressure exists in the power chamber RP.

Figure 4:
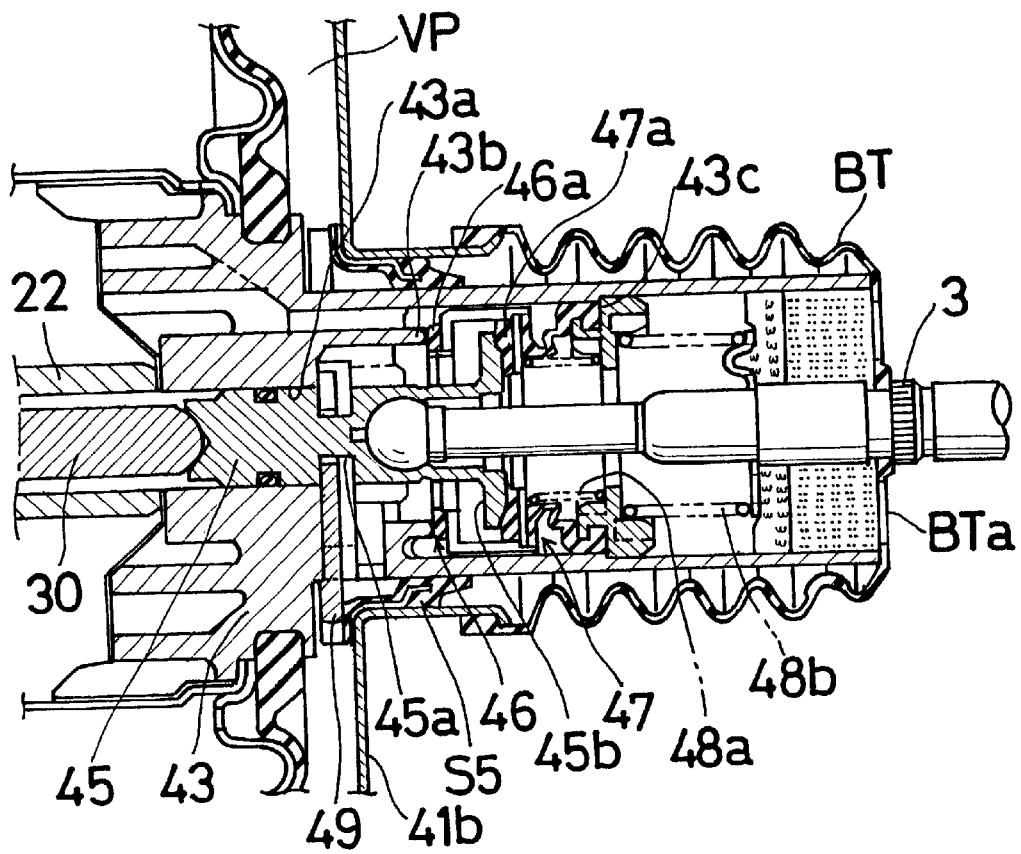
FIG. 4 is an enlarged cross-sectional view of the negative pressure booster of the hydraulic brake apparatus shown in FIG. 1.

As shown in FIG. 1 and FIG. 4, first and second shells 41a, 41b forming front and rear housing parts respectively are coupled via a movable wall 42 to form the negative pressure booster 40. A constant pressure chamber (negative pressure chamber) CP is formed on the front portion of the negative pressure booster and a variable pressure chamber VP is formed on the rear portion of the negative pressure booster. The constant pressure chamber CP is connected to a negative pressure source, such as the intake manifold, via an inlet IN to maintain negative pressure in the constant pressure chamber CP. The negative pressure booster of associated with the illustrated and described embodiment of the present invention is a tandem type booster. Thus, a pair of spaced apart and generally parallel movable walls 42 are positioned within the housing defined by the shells 41a, 41b. The movable walls 42 are constructed with a receiving pressure plate 42a and a diaphragm 42b.

One open end portion (i.e., rear end portion) of a cylindrical actuating member 43 is secured in an air-tight manner to a rear center of the movable wall 42. The other open end portion (i.e., the front end portion) of the actuating member 43 penetrates through the shell 41b and extends in the rearward direction (i.e., to the right in FIGS. 1 and 4). The actuating member 43 is slidably supported by an opening of the shell 41b via a third sealing member S5 and is surrounded by a boot BT. The boot BT is fixed to the input rod 3. A communication bore BTa is formed on the open end portion of the actuating member 43. A third spring 44 is provided between the movable wall 42 and the front housing part 41a to bias the movable wall 42 and the actuating member 43 in rearward direction.

The input rod 3 is positioned on the central axis of the actuating member 43. A plunger 45 is connected to the tip of the input rod 3 via a ball joint. The plunger 45 is slidably supported by an axially extending tenth communication bore 43a formed in the actuating member 43 and is positioned to contact the rear end of a reaction force rod 30. The front end of the reaction force rod 30 is adapted to contact the spool 24. A first valve seat 43b is formed around the tenth communication bore 43a. A first control valve mechanism 46 biasing a first annular valve body 46a by contacting the opening end surface of the valve seat 43b is formed in the actuating member 43. The first control valve mechanism further forms a second valve seat on the rear end portion of the plunger 45. A second control valve mechanism 47 is connected to the first control valve mechanism 46 to bias a second annular valve body 47a by contacting the valve seat 45b.

The second control valve mechanism 47 (functioning as an air valve) is provided with a valve body 47a on the front end of a cylindrical resilient member and is positioned to be biased in the direction of the valve seat 43b by a fourth spring 48a supported on the rear end. The rear end of a resilient member forming the second control valve mechanism 47 is positioned to be biased in the direction of the valve seat 43b by a fifth spring 48b. The second control valve mechanism 47 engages a stepped portion 43c formed in the actuating member 43 by the biasing force.

An annular reduced diameter portion 45a is formed on the rear of the sliding portion on the tip of the plunger 45. A key member 49 is adapted to engage the plunger 45 and is axially movable over a predetermined distance relative to the reduced diameter portion 45a of the plunger 45. The key member 49 also projects from the outer periphery of the actuating member 43 so as to restrict the movement of the plunger 45 in the axially rearward direction by engagement with the housing 41b, thus determining the retracted position of the movable wall 42.

As shown in FIG. 1, the hydraulic pressure pump HP actuated by an electric motor M is forms the pumping device of the present invention. The hydraulic brake pressure is outputted independently from the master cylinder 10. An input side of the hydraulic pressure pump HP is connected to the reservoir 4 and the output side is connected to the power chamber RP by way of the input port 1p. When the output hydraulic pressure (power hydraulic pressure) is supplied to the power chamber RP by the pump HP and communication between the power chamber RP and the reservoir 4 is blocked by the advance of the spool 24, the power piston 22 is actuated to advance or move forward, thereby assisting the operation of the first and second pistons 11, 12 of the master cylinder 10. The reservoir used exclusively for the hydraulic pressure pump HP may be provided in one unit with or separated from the reservoir 4.

A pressure sensor DT detecting the pressure in the variable pressure chamber VP is provided as a detecting device for detecting the operating condition of the negative pressure booster 40. The output signal from the pressure sensor DT is supplied to an electronic control device ECU. The electronic control device ECU is provided with a microcomputer comprising a CPU (not shown) interconnected via a bus line, a ROM (not shown), a RAM (not shown), input ports, and output ports (not shown). Output signals from each sensor such as the pressure sensor DT are inputted at each input port to the CPU via an amplification circuit (not shown).

The actuation start judgment of the hydraulic pressure pump HP is as follows. First, the pressure Pv in the variable pressure chamber VP detected by the pressure sensor DT is compared to a predetermined pressure Kp. When the pressure Pv is greater than Kp, the electric motor M is started to output hydraulic brake pressure from the hydraulic pressure pump HP. In other words, the electric motor M is not supplied with the electricity and the hydraulic pressure pump Hp is not activated until negative pressure Pv in the variable pressure chamber VP reaches the predetermined pressure Kp. The predetermined pressure Kp is determined based on the limitation for assistance of the negative pressure booster 40. It is preferable to determine the variable pressure chamber VP as a negative pressure value immediately before the atmospheric pressure (that is immediately before the negative pressure booster 40 reaches its limitation for assistance) for ensuring the smooth transition when the assistance of the hydraulic pressure booster 20 by the hydraulic pressure pump HP is applied.

Differentiating the pressure Pv value in the variable pressure chamber VP and obtaining the differential DPv of the pressure Pv, the differential DPv may be compared to a predetermined value Kdp. It is preferable to determine the predetermined value Kdp at the pressure differential immediately before the negative pressure booster 40 reaches the limitation for assistance. As a judgment condition, the result of the comparison of the pressure Pv with the predetermined pressure Kp and the comparison of the differentiated pressure DPv with the predetermined value Kdp may be combined to start up the electric motor M when both conditions are satisfied. In this way, the operation of the pump HP can be initiated when the detected pressure Pv is greater than the predetermined pressure Kp and when the differentiated pressure DPv is greater than the predetermined value Kdp. In addition, the output of a conventional brake switch (not shown) detecting that the brake pedal 2 is depressed may be applied to start up the electric motor M when the pressure Pv and/or the differential pressure DPv exceeds the predetermined pressure Kp and/or the predetermined value Kdp.

As a mechanism for detecting the depression or amount of depression of the brake pedal 2, a stroke sensor may be used. The output from the stroke sensor can be used to compare the stroke St of the brake pedal 2 which is a detecting output to a predetermined stroke KSt, and to start up the electric motor M when the stroke St is greater than the predetermined stroke KSt. In this case, it is preferable to determine the predetermined stroke KSt as a value immediately before the negative pressure booster 40 reaches the limitation for assistance for ensuring the smooth transition when the assistance by the hydraulic pressure booster 20 is applied. The differential DSt of the stroke may also be obtained by differentiating the stroke St and comparing the differential DSt to a predetermined value Kds. It is preferable to determine the predetermined value Kds as a stroke differential immediately before the negative pressure booster reaches the limitation for assistance. The electric motor M may be started up when conditions associated with both the stroke St and the differential of the stroke DSt are satisfied.

As a detecting mechanism for detecting the depressed amount of the brake pedal 2, a pedal sensor (not shown) detecting the stepping force applied to the brake pedal 2 and a pressure sensor (not shown) detecting the output hydraulic brake pressure of the master cylinder 10 can be employed. The actuation start judgment of the hydraulic pressure pump HP can be conducted using the stepping force or master cylinder hydraulic pressure and/or the differentials of the values obtained from above-mentioned sensors. A vehicle speed sensor (not shown) may be further provided for controlling the actuation of the electric motor M in accordance with the output signal thereof and for controlling the operation of the hydraulic pressure pump Hp in accordance with the vehicle speed.

When the negative pressure booster 40 reaches the limitation for assistance, the movement of the first and the second pistons 11, 12 is further assisted by the output hydraulic pressure of the hydraulic pressure pump HP (i.e., hydraulic pressure assistance is conducted). For instance, when it is determined that a detecting output of the pressure sensor DT has exceeded a predetermined standard value, the electric motor M is actuated to supply the output hydraulic pressure of the hydraulic pressure pump HP to the power chamber RP to assist the first and the second pistons 11, 12.

The overall operation of the hydraulic pressure brake apparatus of the present invention is as follows. Each component is positioned in the condition illustrated in FIGS. 1–4 when the brake pedal 2 is not depressed. Accordingly, the negative pressure booster 40 is not operated, the valve body 47a of the second control valve mechanism 47 is opened relative to the valve seat 45b, and the introduction of atmospheric pressure into the variable pressure chamber VP is blocked. In this case, only the negative pressure in the constant pressure chamber CP is associated with the first control valve mechanism.

When the brake pedal BP connected to the input rod 3 is depressed, the input rod 3 is moved in the forward direction (i.e., to the left) along with the plunger 45. As a result, the valve seat 43b of the actuating member or driving means 43 is engaged with the valve body 46a of the first control valve mechanism 46 to interrupt fluid communication between the constant and variable pressure chambers CP, VP. Then the valve body 47a of the second control valve mechanism 47 is separated from the valve seat 45b to introduce atmospheric pressure into the variable pressure chamber VP through the boot Bta and the pressure in the variable pressure chamber VP is increased. This leads to the application of a forward force pressing the movable wall in the forward direction to actuate the second piston 12 in the forward direction via the actuating member 43, the power piston 22, the sleeve 23, the reaction force rubber disc 26, and the output rod 27, thus further actuating the first piston 11 in the forward direction.

Under the boosting operation by the negative pressure booster 40, when the master cylinder hydraulic pressure is increased by the pressure increase in the pressure chambers R1, R2, the outer peripheral portion of the reaction rubber disc 26 is compressed, the central portion of the reaction disc 26 is expanded or deformed in the rearward direction via the central stepped bore 23a of the sleeve 23, and the rearwardly directed reaction force that is in proportion to the output hydraulic pressure of the master cylinder 10 relative to the input rod 3 is applied via the transmitting member 25, the spool 24, the reaction rod 30 and the plunger 45 to control the first valve control mechanism 46 and the second valve control mechanism 47 in accordance with the difference between the reaction force and the operation force of the brake pedal 2 applied to the input rod 3.

When it is judged that the negative pressure booster 40 has almost reached the limitation for assistance based on the output signal of the pressure sensor DT, the electric motor M is started up to actuate the hydraulic pressure pump HP. For instance, the electric motor M is started when the pressure Pv in the variable pressure chamber VP detected by the pressure sensor DT is greater than the predetermined pressure Kp to supply the output hydraulic pressure of the hydraulic pressure pump HP to the power chamber RP via the input port Ip.

Immediately before the negative pressure booster 40 reaches the limitation for assistance, the output hydraulic pressure of the hydraulic pressure pump HP, that is the power hydraulic pressure, is supplied to the power chamber RP. When the negative pressure booster 40 reaches the limitation for assistance, the spool 24 advances relative to the power piston 22 in accordance with the depression of the brake pedal 2 and so the ninth communication bore 23c of the sleeve 23 is blocked by the stepped portion 24b of the spool 24, whereby communication between the power chamber RP and the hydraulic chamber R3 is blocked. This leads to the application of the power hydraulic pressure to the rear end surface of the larger diameter portion 22a of the power piston 22, thus pressing the second power piston forward applying the assistance by the hydraulic pressure booster 20. Because the reaction force is transmitted to the input rod 3 via the reaction rubber disc 26 in the same manner as under the operation of the negative pressure booster 40, the reaction force is continuously transmitted so as to not cause exceptional output characteristics when the hydraulic pressure assistance is applied.

Figure 5:
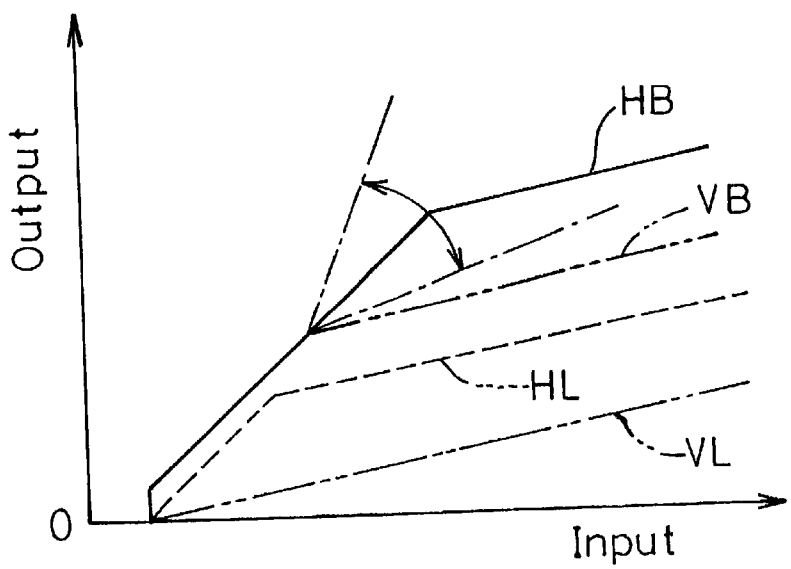
FIG. 5 is a graph showing the input and output characteristics of the hydraulic brake apparatus according to the present invention.

It is possible with the hydraulic pressure brake apparatus of the present invention to obtain input and output characteristics as shown in FIG. 5 upon the depression of the brake pedal 2. FIG. 5 shows the relationship between the input (stepping force to the brake pedal 2) and the output (the output hydraulic brake pressure of the master cylinder 10). The chain double-dashed line VB corresponds to the characteristics when the negative pressure booster 40 has reached the limitation for assistance. The solid line HB above the chain double-dashed line VB corresponds to the characteristics when the assistance from the negative pressure booster 40 is added with the assistance from the hydraulic pressure booster 20. The chain double-dashed line VL on the bottom of the graph corresponds to the characteristics when the negative pressure booster 40 fails. The dashed line HL corresponds to the characteristics when the negative pressure booster 40 lost the force and the assistance by the hydraulic pressure booster 20 is conducted. The undesignated chain lines show the input and output characteristics of the conventional apparatus when the assistance by the hydraulic pressure booster is applied. Because two reaction force mechanisms exist in the conventional apparatus, the setting and the adjustment is difficult. Accordingly, the input and output characteristics of the conventional apparatus after applying the hydraulic pressure assistance changes in the range indicated with an arrow.

With the present invention, a single reaction force member is structured with only the reaction force rubber disc 26. Thus, the reaction force in accordance with the depression of the brake pedal 2 is determined to smoothly add the assistance by the hydraulic pressure booster 20 after the limitation for assistance of the negative pressure booster 40. With this structure, the desired range and a wide range of the boosting performance can be set relatively easily.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic pressure brake apparatus comprising:
    a master cylinder that includes a master cylinder piston advanced in accordance with depression of a brake pedal to increase a brake fluid pressure from a reservoir and output a hydraulic brake pressure;
    negative pressure assistance means for assisting advancement of the master cylinder piston by negative pressure in accordance with the depression of the brake pedal;
    a pump for increasing the brake fluid pressure of the reservoir independently from the master cylinder to output the hydraulic brake pressure;
    hydraulic pressure assistance means having a power chamber formed rearward of the master cylinder piston for supplying the hydraulic pressure output from the pump to the power chamber to assist the master cylinder piston;
    valve means controlling an assistance force of the master cylinder piston by the hydraulic pressure assistance means;
    a single reaction force member provided between the master cylinder piston and the hydraulic pressure assistance means to transmit a reaction force to the brake pedal.

2. The hydraulic pressure brake apparatus according to claim 1, wherein the hydraulic pressure assistance means is positioned to advance the master cylinder piston and is provided with a power piston forming the power chamber rearward of the master cylinder piston, the power piston being connected to the negative pressure assistance means.

3. The hydraulic pressure brake apparatus according to claim 2, wherein the valve means is structured with a spool valve mechanism having a spool that is movable relative to the power piston in accordance with the brake pedal depression, and the reaction force member is a reaction force rubber disc positioned between the spool and the master cylinder piston.

4. The hydraulic pressure brake apparatus according to claim 1, wherein the negative pressure assistance means includes a housing having an interior divided by a movable wall into a constant pressure chamber communicated with a negative pressure source and a variable pressure chamber alternatively communicated with the constant pressure chamber and atmosphere, the movable wall being engaged with an actuating member to advance the actuating member upon communication of the variable pressure chamber with the atmosphere.

5. The hydraulic pressure brake apparatus according to claim 4, wherein the actuating member engages a power piston, said power piston having a larger diameter portion and a smaller diameter portion, the larger diameter portion forming the power chamber.

6. The hydraulic pressure brake apparatus according to claim 5, wherein the power piston engages a sleeve, one end portion of the sleeve being slidable fitted in the power piston and an opposite end of the sleeve engaging the single reaction force member.

7. The hydraulic pressure brake apparatus according to claim 6, wherein the valve is a spool valve positioned within the one end portion of the sleeve that is slidably fitted into the power piston.

8. A hydraulic pressure brake apparatus comprising:
    a master cylinder that includes a master cylinder piston advanced in accordance with depression of a brake pedal to increase brake fluid pressure from a reservoir and output a hydraulic brake pressure;
    a housing having an interior divided by a movable wall into a constant pressure chamber communicated with a negative pressure source and a variable pressure chamber alternatively communicated with the constant pressure chamber and atmosphere, and a control valve for communicating the variable pressure chamber with atmosphere upon depression of the brake pedal to produce an assisting force for moving a power piston to assist advancement of the master cylinder piston, the power piston forming a power chamber rearward of the master cylinder piston;
    a pump communicated with the power chamber to increase brake fluid pressure of the reservoir independently from the master cylinder and output hydraulic brake pressure to the power chamber;
    a valve controlling pressure in the power chamber to provide a hydraulic pressure assistance to the master cylinder piston; and
    a reaction force member provided between the master cylinder piston and the power piston to transmit a reaction force to the brake pedal.

9. The hydraulic pressure brake apparatus according to Claim 8, wherein the valve is a spool valve mechanism having a spool that is movable relative to the power piston in accordance with the brake pedal depression.

10. The hydraulic pressure brake apparatus according to claim 9, wherein the reaction force member is a single reaction force rubber disc positioned between the spool and the master cylinder piston.

11. The hydraulic pressure brake apparatus according to claim 8, wherein the reaction force member is a single reaction force rubber disc constituting the only reaction force member.

12. The hydraulic pressure brake apparatus according to claim 8, wherein the movable wall engages an actuating member that contacts the power piston. said power piston having a larger diameter portion and a smaller diameter portion, the larger diameter portion forming the power chamber.

13. The hydraulic pressure brake apparatus according to claim 12, wherein the power piston has a larger diameter portion and a smaller diameter portion, the larger diameter portion forming the power chamber.

14. The hydraulic pressure brake apparatus according to claim 8, wherein the power piston engages a sleeve, one end portion of the sleeve being slidable fitted in the power piston and an opposite end of the sleeve engaging the reaction force member.

15. The hydraulic pressure brake apparatus according to claim 14, wherein the valve is a spool valve positioned within the one end portion of the sleeve that is slidably fitted into the power piston.

* * * * *